United States Patent [19]
Shepherd

[11] Patent Number: 5,129,813
[45] Date of Patent: Jul. 14, 1992

[54] EMBOSSED VACUUM BAG, METHODS FOR PRODUCING AND USING SAID BAG

[76] Inventor: G. Maury Shepherd, 3818 Southwestern St., Houston, Tex. 77005

[21] Appl. No.: 653,098

[22] Filed: Feb. 11, 1991

[51] Int. Cl.⁵ .................. B29C 43/18; B29C 43/56
[52] U.S. Cl. ......................... 425/504; 425/388; 428/156; 428/167; 428/172; 156/286; 249/82; 249/127; 249/155; 249/60; 264/511; 264/313; 264/258
[58] Field of Search ............. 264/510, 511, 512, 546, 264/553, 571, 572, 257, 258, 102, 313, 314; 249/82, 60, 127, 155; 156/286, 287, 104, 105; 428/156, 167, 172; 425/503, 504, 388, 389

[56] References Cited

U.S. PATENT DOCUMENTS

| | | | |
|---|---|---|---|
| 2,913,036 | 11/1959 | Smith | 264/DIG. 53 |
| 2,983,638 | 5/1961 | Quehl | 428/156 |
| 3,309,450 | 3/1967 | Rodgers | 156/242 |
| 3,311,517 | 3/1967 | Keslar et al. | 156/104 |
| 3,703,422 | 11/1972 | Yoshino | 156/285 |
| 4,311,661 | 1/1982 | Palmer | 264/510 |
| 4,562,033 | 12/1985 | Johnson et al. | 264/510 |
| 4,873,044 | 10/1989 | Epel | 264/257 |
| 4,942,013 | 7/1990 | Palmer et al. | 264/511 |
| 4,975,311 | 12/1990 | Lindgren | 428/156 |

*Primary Examiner*—Jay H. Woo
*Assistant Examiner*—Jeremiah F. Durkin, II
*Attorney, Agent, or Firm*—Foley & Lardner

[57] ABSTRACT

A vacuum bag including a non-porous material having impressed therein a three-dimensional pattern which defines a plurality of interconnected channels, methods for producing the vacuum bag, molding methods using the vacuum bag, and improved composite articles produced by the molding method, are disclosed.

24 Claims, 4 Drawing Sheets

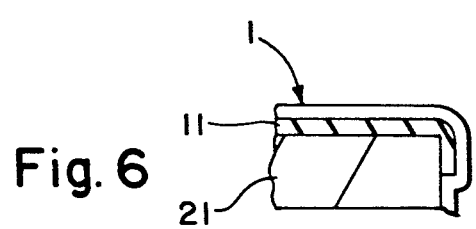
Fig. 6
Fig. 5
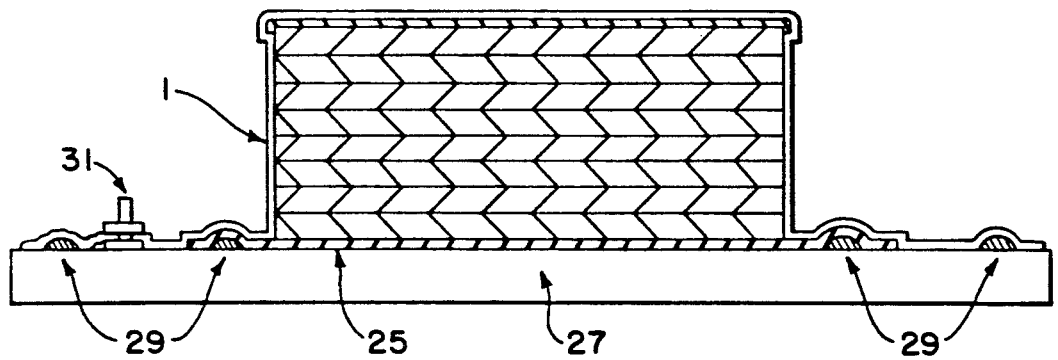

EMBOSSED VACUUM BAG, METHODS FOR PRODUCING AND USING SAID BAG

BACKGROUND OF THE INVENTION

The present invention relates to an improved vacuum bag, to a method for producing the improved bag, and to a vacuum bag molding process employing the improved bag. The present invention further relates to a composite article produced by the process.

The vacuum bag technique is well known in the art. The technique is widely used in the manufacture of high-strength, light-weight and high-temperature composite articles, in particular reinforced plastic composites. Known vacuum bag processes can be divided into two main types: wet lay-up and dry lay-up. The wet lay-up process is less preferable because it requires more resin and more assembly time, and is therefore more expensive. The dry lay-up, or prepreg, process employs fibrous reinforcement materials preimpregnated with resin and partially cured.

The prepreg process can in turn be divided into two types: the bleed method and the no-bleed method. The bleed method requires extraction or displacement of excess resin during the molding and curing process, in order to produce the desired resin/reinforcement ratio and thus part strength. The bleed method, like the wet lay-up method, wastes resin and time and is therefore less preferable. The no-bleed method employs prepregs having a resin content near or at the desired net resin content. Since there is no resin displacement, there is no need for the use of bleeder materials or barrier materials to prevent resin from reaching and plugging the vacuum lines in the vacuum bag. The need for breather materials to distribute air and volatiles escaping from the prepreg during the curing process is also eliminated. Accordingly, the total cost reduction associated with the prepreg method of vacuum bag molding is substantial both in terms of materials and labor.

All of the presently known vacuum bag molding methods, however, employ vacuum bags comprised of smooth films or sheet materials. Use of smooth vacuum bags has certain disadvantages. No specific provision is made in the film for migration of the displaced air inside the vacuum bag to the vacuum ports. Residual air pockets between the vacuum bag and the composite article enclosed therein, if not removed, will cause defects in the composite article, resulting in rejection of the part. Wrinkles that form in the vacuum bag during the evacuation process, especially if the part is irregularly shaped, can be transferred to the surface of the part during curing, resulting in a defective part.

In order to reduce the tendency of smooth vacuum bags to trap air, the evacuation process must be slowed down. This reduces production rates and increases costs. In addition, air pockets and wrinkles that do form must be manually displaced during the evacuation process. Such manual smoothing reduces the production rate. Moreover, manual smoothing can result in perforation of the vacuum bag, or seam separation, which will produce a defective part and furthermore require expenditure of additional time to locate and repair the perforation or separated seam. Finally, production of irregularly shaped parts often entails the use of special vacuum bags corresponding to the shape of the part. Such bags are more costly to produce, and are more susceptible to failure due to puncture or seam separation.

In known prepreg processes, the prepregs are maintained at a low temperature in a refrigerator until use, in order to retard curing which would take place at ambient temperature. As each prepreg is stacked to build up the lay-up and subjected to the slow manual smoothing process, however, the temperatures of the prepregs rise. Consequently, by the time the lay-up has been completely assembled and is ready for application of vacuum and subsequent cure, a temperature gradient, and thus a gradient in curing rates, exists between the first and last prepregs. This gradient results in nonuniformities in the bonding between the prepreg layers of the lay-up. The required manual smoothing in addition tends to disrupt the alignment of the reinforcements (e.g., fibers) within the prepregs, adversely affecting the strength of the composite article.

A clear need exists, therefore, for an improved vacuum bag and vacuum bag molding process, in particular a prepreg process, which avoid the foregoing problems, and which in particular allow evacuation of air from the vacuum bag without the formation of air pockets and wrinkles. A need also exists for an improved composite article produced by the vacuum bag molding process, which avoids the foregoing problems.

SUMMARY OF THE INVENTION

Accordingly, it is an object of the present invention to provide a method for vacuum bag molding in which air within the bag can be quickly and easily evacuated without formation of air pockets and wrinkles.

Another object of the present invention is to provide a method that eliminates the need for manual displacement of trapped air, and thus reduces the chances of accidental bag puncture or seam separation.

A further object of the present invention is to provide a method useful for producing irregularly shaped composite articles which reduces the need for employing vacuum bags having specially fabricated gussets and pockets.

Still another object of the present invention is to provide a method that is highly economical, in particular a method that is relatively rapid, has a reduced number of steps, and is low in materials and labor costs.

Yet another object of the present invention is to provide an improved vacuum bag useful in the improved method.

Still a further object of the present invention is to provide a method for producing the foregoing improved vacuum bag.

An additional object of the present invention is to provide an improved composite article produced by the improved method.

In accomplishing the foregoing objectives, there has been provided, in accordance with one aspect of the present invention, a vacuum bag comprising a non-porous material having impressed therein a three-dimensional pattern which defines a plurality of interconnected channels. Preferably, the non-porous material is a plastic material, particularly a thermoplastic material.

In accordance with another aspect of the present invention there is provided a method of producing a vacuum bag comprising the steps of: providing a non-porous material as a substrate; impressing on the substrate a three-dimensional pattern which defines a plurality of interconnected channels; and subsequently forming the substrate into a vacuum bag. A vacuum bag produced by the inventive method is also provided.

In accordance with a further aspect of the present invention there is provided a method of making a composite structure comprising the steps of: applying a release material to a mold; placing on the release material a resin impregnated lay-up comprising reinforcing fiber and uncured or partially cured resin which is to be formed into the composite structure; enclosing the release material and the lay-up within a vacuum bag sealed to the mold, wherein the vacuum bag is as described above, whereby a plurality of interconnected channels are defined between the vacuum bag and the surfaces of the lay-up covered by the vacuum bag; evacuating the vacuum bag, whereby said vacuum bag collapses such that upon completion of the evacuation the three-dimensional pattern in the vacuum bag relaxes into a locally flat two-dimensional configuration and the vacuum bag lies flat against the surfaces of the lay-up in intimate contact therewith; and curing the resin in the lay-up to form the composite structure. An optional second release material can be applied to the upper surface of the lay-up before enclosure by the vacuum bag.

In accordance with still another aspect of the present invention there is provided a method of making a composite structure comprising the steps of: enclosing a lay-up within a vacuum bag as described above, whereby a plurality of interconnected channels are defined between the vacuum bag and one or more of the surfaces of the lay-up; evacuating the vacuum bag in the above-described manner; and curing the resin in the lay-up to form the composite structure. A release material can be applied to one or more of the surfaces of the lay-up before enclosure by the vacuum bag. A tool or mold can also support the lay-up within the vacuum bag.

Composite articles produced by the foregoing methods are also provided.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawing by which

FIG. 5 is a cross-sectional view of the arrangement of FIG. 3, after evacuation and relaxation of the vacuum bag;

FIG. 6 is an enlarged view of the same section as in FIG. 4, after evacuation;

Figures 1, 2:
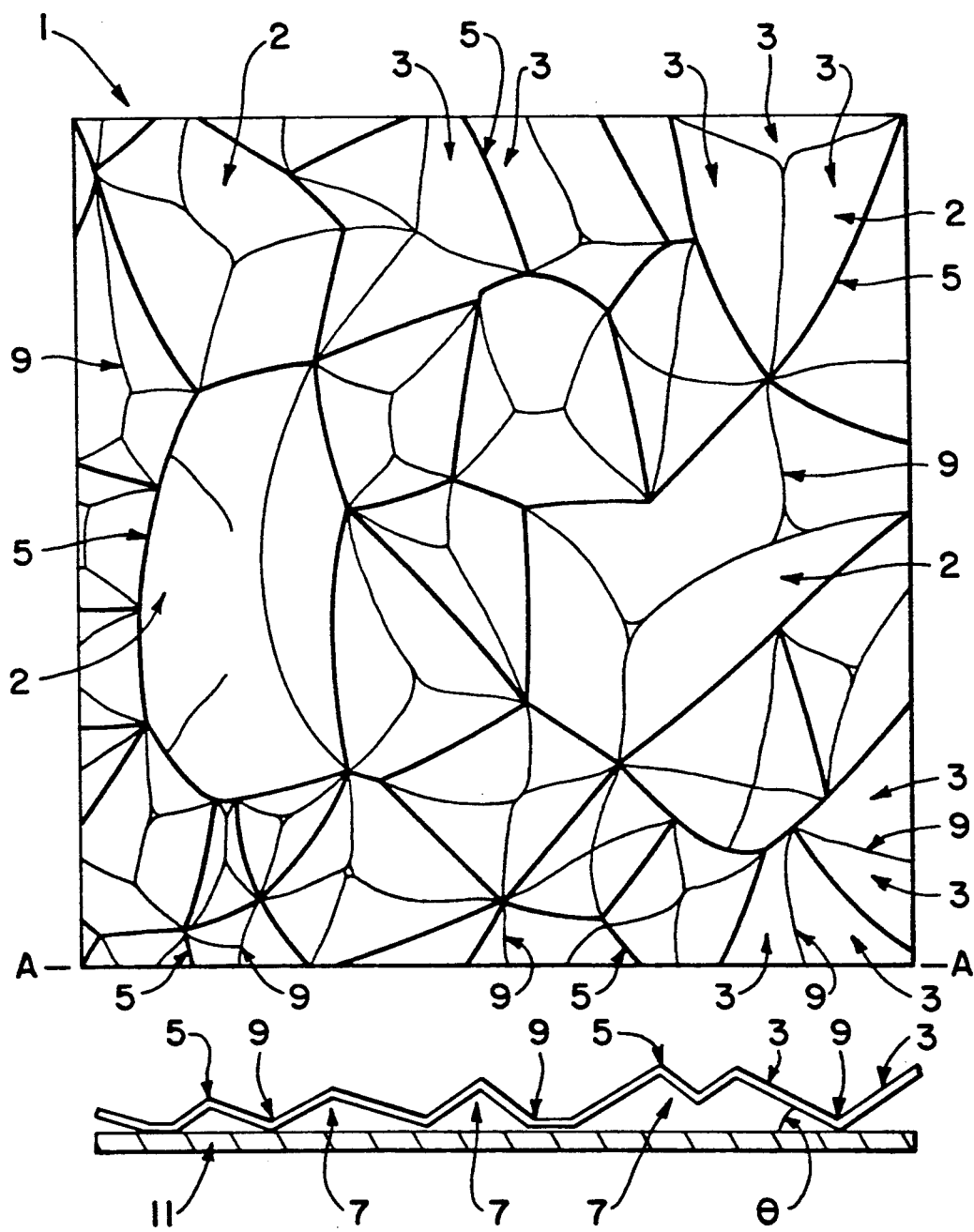
FIG. 1 is a plan view of an enlarged section of a vacuum bag according to the invention, facing the side thereof to be placed in contact with the lay-up.
FIG. 2 is a cross-sectional view along line A—A of the vacuum bag of FIG. 1 in contact with a lay-up, showing in detail the formation of a plurality of enclosed channels.

Like features are labeled alike throughout the figures.

DETAILED DESCRIPTION OF PREFERRED EMBODIMENTS

A vacuum bag according to the invention is produced from a film or sheet, comprised of at least one layer of a non-porous material capable of forming an air-tight barrier. Preferably, the substrate from which the vacuum bag is formed is a single sheet or film of a thermoplastic material. A three-dimensional pattern that defines a plurality of interconnected channels is impressed into the film or sheet. The pattern is impressed into the film or sheet in such a way that the deformations have both male and female sides, i.e., the film or sheet is deformed across its entire thickness. When the vacuum bag is placed over a lay-up (which can optionally have a release film on the top thereof), such that portions of the male, or convex, side are in contact with the surface of the lay-up, a plurality of enclosed interconnected channels is temporarily defined between the convex deformations of the vacuum bag and the surfaces of the lay-up in contact therewith.

The deformations impressed into the vacuum bag thus allow the atmosphere inside the vacuum bag to be removed more quickly and more completely than is possible in the known vacuum bag processes. The atmosphere within the vacuum bag migrates to the evacuation ports through the plurality of temporary channels. During the course of the evacuation, the three-dimensional structure of the vacuum bag gradually relaxes, i.e., the deformations in the vacuum bag gradually collapse, until at last the channels disappear and the fully collapsed vacuum bag lies flat against the surfaces of the enclosed lay-up and in intimate contact therewith. At the end of the evacuation, the three-dimensionally deformed vacuum bag thus reverts to the original two-dimensional (i.e., locally flat) form of the thermoplastic film from which it was produced. Here, "locally flat" denotes flatness on a scale sufficiently small as to be substantially unaffected by the curvature of regions of the vacuum bag corresponding to non-planar regions of the underlying lay-up, i.e., corners, spherical or ellipsoidal surfaces, indentations, etc.

Moreover, the deformations in the film comprising the vacuum bag enable the bag to more easily and uniformly conform to the shape of the lay-up enclosed therein. After evacuation has been completed, the inventive vacuum bag is fully conformal with the enclosed lay-up. This is a particularly beneficial aspect of the invention in that it helps to avoid bridging.

The vacuum bag according to the invention can be produced using substrate films comprised of a variety of materials. Preferred are plastic films such as thermoplastic polyamide films, particularly films made of nylon-6 or nylon-66. Additional nonlimiting examples of films useful in producing vacuum bags according to the invention are films made of polyethylene terephthalate (PET), polyether ether ketone (PEEK), polyetherimide (PEI), polyether sulfone (PES), polytetrafluoroethylene (PTFE), polyimide, and halohydrocarbon resins. The selection of specific materials to form the film will depend on factors such as the composition of the lay-up to be cured, the temperature and pressure conditions to be employed during the vacuum bag molding process, and also the physical properties of the film formed from the material, in particular the flexural modulus of the film. The selected material must produce a film that is capable of relaxing to a two-dimensional, locally flat form at the end of the evacuation process under the conditions employed by the process. Identification of optimum materials is within the skill of the ordinary artisan.

The thermoplastic film used to produce the inventive vacuum bag can be manufactured by a variety of techniques well-known to the art, such as the cast-film process (using a straight slot-type die) or the blown film process (using an annular die). The film may, if desired, be mono- or biaxially oriented.

Exemplary thermoplastic materials which are readily available commercially and which can be employed to produce films suitable for use in the inventive vacuum bags are given in Table 1.

The pattern impressed into the film used to form the vacuum bag according to the invention is a three-dimensional pattern of embossed cells which can be either of random shape or geometrically regular. A wide range of patterns can be effectively employed. The only requirements in selection of a pattern are that the particular pattern selected must be such that the film upon which it is impressed has sufficient rigidity to maintain its deformed, three-dimensional shape during the initial evacuation of the vacuum bag, and that the pattern subsequently relax and flatten into a locally flat, two-dimensional surface as the evacuation is completed.

The properties of the thermoplastic film material, in particular, the flexural modulus of the film, will also influence the selection of the pattern to be impressed thereon. The flexural modulus of the material must be such that the three-dimensional pattern impressed on the film will flatten into a locally flat, two-dimensional configuration under atmospheric pressure as the vacuum bag is evacuated, thus allowing the film to smooth out and conform to the shape of the surface of the lay-up within the vacuum bag.

Typically, patterns characterized by large acute angles, or right angles, between the cell walls and the plane defined by the upper edges of the channels, that is, by the surface of the lay-up in contact with the vacuum bag, are preferably employed with softer, more flexible materials. Conversely, patterns characterized by smaller acute angles between the cell walls and the lay-up surfaces are suitable for use with stiffer materials which are more resistant to deflection.

In general, those patterns in which the cell walls are more nearly normal to the surface of the lay-up are more resistant to compressive forces. Thus, for example, a pyramidal pattern would be less rigid than a cubic pattern in the same material. Aspect ratio, the ratio of the height of the cell to its width, also contributes to the resistance of the pattern to deformation from atmospheric pressure. Higher aspect ratio patterns, i.e., those that are taller than they are wide, will have more compressive resistance than low aspect ratio patterns.

Exemplary patterns are those based on repeated cells such as cubes, rectangular prisms, and triangular, rectangular or hexagonal pyramids and frustra thereof. Irregular patterns comprising adjacent cells of random geometric shape (e.g., "crushed ice" patterns) are also preferably employed. In general, any pattern that defines plural interconnected channels can be employed in the invention. Exemplary of patterns useful according to the invention are patterns having few or no flat surfaces parallel to, or in contact with, the surface of the lay-up when the vacuum bag is placed over the lay-up, e.g., regular or irregular pyramidal patterns. However, it is emphasized that the particular pattern selected is not critical to the invention, as long as the foregoing criteria (interconnected channel definition, sufficient rigidity, flexural modulus, etc.) are satisfied.

The selected pattern is impressed into a substrate used to produce the inventive vacuum bag. In a preferred embodiment, the pattern is impressed into a thermoplastic film substrate using standard embossing techniques. The film temperature is first increased to the film softening temperature. After heating, the film can then be impressed with the desired pattern by a number of methods known to the skilled artisan. Appropriate methods include use of patterned rolls, or perforated rolls equipped with internal vacuum capability; press-type sheet- or roll-fed thermoforming or vacuum forming; or texturing in conjunction with cast-type film extrusion equipment.

Once the film has been impressed with the desired pattern, it is cooled to a temperature low enough to allow it to be rewound into rolls or finished into sheets or other configurations as required by the end user.

In an exemplary process for impressing a pattern into a nylon-6 film for use in a vacuum bag according to the invention, the nylon-6 film is heated to a temperature equal to at least the softening temperature for a period of time necessary to ensure uniform film temperature throughout the area to be impressed with the selected pattern. The film is then passed between two engraved steel rolls, one roll rotating with the other. The roll temperature is controlled so as not to allow the rolls to exceed the melt temperature of the film. Sufficient pressure is applied to the rolls to prevent the film from forcing the rolls open during the embossing process. The speed of the rolls is adjusted to a rate sufficient to allow the film to be heated and formed while the film is within the forming temperature range. This speed is a function of the film thickness, the distance to be passed through the heating system and the type of heating system to be used, and is readily determined through routine testing.

Immediately after the pattern is impresses into the film, the film is cooled to a temperature below the softening temperature. Subsequently the film is rolled up with commercially available film rewind equipment, using techniques known to the art.

The impression process, as noted above, is carried out at a temperature higher than the softening temperature of the film. The pattern impressed in the film will stay in the film, in the absence of compressive forces, up to the temperature at which the film was heated when the deformation occurred. When the film reaches the temperature at which it was deformed, it will begin to lose its pattern without the influence of outside forces (e.g., atmospheric pressure). This pattern relaxation also helps ensure that the film will not bridge.

It is essential that the thermoplastic material and the pattern impressed thereon permit controlled collapse of the vacuum bag during the evacuation process. Premature collapse will result in trapped air within the vacuum bag, with its attendant problems (as experienced in the prior art). On the other hand, a pattern which fails to completely collapse upon evacuation (e.g., is not flattened by atmospheric pressure) will cause a surface defect in the molded part in the same manner as wrinkles in the prior art processes.

It is also important that there be no tension in the thermoplastic film used to form the inventive vacuum bag during the deformation process (i.e., impression of the selected pattern on the film used to form the vacuum bag). Any residual shrinkage must be accounted for when the film reaches elevated temperatures where it begins to become dimensionally unstable. Typically, induced film tension in roll-type pattern formation caused by film shrinkage is compensated for by differential roll surface speeds, which allow for dimensional change in the film in the direction of travel. Other methods for eliminating film tension known to the skilled artisan can also be employed. Elimination of processing tensions results in increased dimensional stability of the vacuum bag at the elevated temperatures present in the autoclave used to cure the composite article. High-temperature dimensional stability is also important in order to avoid bridging.

A vacuum bag according to the invention can be formed from the patterned thermoplastic sheet or film in the customary manner, taking into account the shape of the part to be molded. Typically, fabrication of vacuum bags is accomplished by cutting the film into shapes necessary to correspond to the lay-up to be bagged, followed by joining the parts by adhesive bonding using, e.g., unvulcanized rubber, ultrasonic welding, heat welding or other known methods, to form an airtight bag. The particular joining method is not critical to the invention. In particular, minor surface markings due to the presence of weld seams can easily be removed by hand-polishing the cured part.

During the vacuum bag molding process, as the air is removed from the bag, a pressure differential is created across the bag which urges the film against the surface of the lay-up within the bag, i.e., causes the impressed pattern to collapse. The rate of collapse increases as the amount of air remaining within the bag decreases. Due to this collapse, the interconnected channels progressively decrease in size, but still allow air to be effectively removed without being trapped, as would result from quick uncontrolled contact between the film and the surface of the lay-up. The pattern impressed in the vacuum bag provides only a small contact area with the lay-up or optional release sheet, at the ridges and/or surfaces (e.g., in the case of cubes or pyramidal frustra) defined between the plurality of defined interconnected channels. This limited area of contact does not provide sufficient resistance to prevent collapse of the three-dimensional pattern during evacuation of the vacuum bag.

Upon completion of the evacuation process, the completely relaxed vacuum bag is in direct contact with the surface of the lay-up and/or release sheet over its entire surface. The presence of trapped air pockets or wrinkles is thereby avoided. Subsequently, the lay-up is cured in an autoclave in a manner known to the art. The curing pressure can be atmospheric or superatmospheric, as desired.

Removal of the inventive vacuum bag from an uncured lay-up is easily accomplished, if necessary, because the pattern will be retained in the bag, thus minimizing the area of contact, as long as the bag has not been exposed to a temperature exceeding the temperature at which the pattern was impressed in the film. Removal of the bag from a cured composite article is accomplished in the same manner in which conventional smooth films are removed.

The film can be reused, if desired, but only if the cure temperature is lower than the impression temperature (exposure to temperatures in excess of the temperature at which the pattern was impressed will degrade the pattern). However, repeated applications of heat and pressure will generally diminish the effectiveness of the inventive vacuum bag in comparison to that realized in the initial use thereof. Moreover, the removal process entails the risk of inadvertent puncture or seam separation. Reuse of the bag is thus not preferred.

Since the inventive method is faster than presently known methods, less time elapses between the stacking of the first and last prepreg layers of the lay-up. The gradient in reaction rates within the various stacked layers in the lay-up due to temperature differences is eliminated. Thus, cured composite articles produced according to the method of the invention display more complete and uniform bonding between the prepreg layers of the lay-up than articles produced according to known methods. Moreover, since the need for manual displacement of air pockets is eliminated, there is much less disruption of the alignment of fibers in the prepreg layers of the lay-up. Also, due to the reduced tendency toward bridging achieved with the inventive method, composite articles produced thereby exhibit more uniform density in concave regions.

Referring now to the drawing, in FIG. 1 an enlarged section of a vacuum bag 1 produced according to the invention is shown. The substrate material from which the bag is produced, such as a thermoplastic film, has impressed therein a plurality of cells 2, here of irregular form, which here project upward from the plane of the figure. The cells 2 each have a plurality of walls 3, which intersect at ridges 9 within each cell. Adjacent cells 2 meet along lines 5. These lines 5, along with walls 3 of the cells on either side of the lines, define a plurality of interconnected channels 7 through which the air flows during the evacuation process.

FIG. 2 shows in cross-section along line A—A of FIG. 1 the disposition of the enlarged section of vacuum bag 1 on top of an optional release sheet 11. As shown, the ridges 9 of cells 2 contact the lay-up surface, with the walls 3 of each contacting cell forming an angle $\theta$ (which can be the same or different for each cell or cell wall) with the upper surface of release sheet 11. The open interconnected channels 7 are then bounded by release sheet 11. Release sheet 11 can be omitted, in which case vacuum bag would be in direct contact with the upper surface of the enclosed lay-up.

Figure 4:
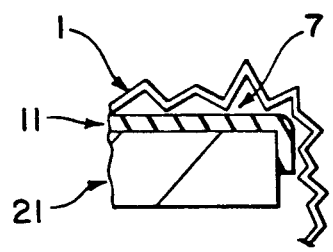
FIG. 4 is an enlarged view of a section of FIG. 3, showing in detail the disposition of the vacuum bag in relation to the lay-up.
Figure 3:
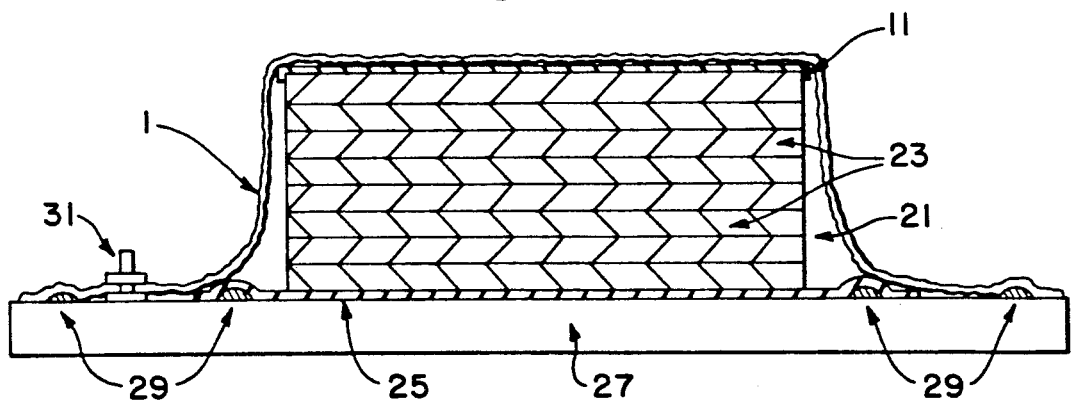
FIG. 3 is another cross-sectional view of a vacuum bag according to the invention and a lay-up covered thereby, prior to evacuation.

In FIG. 3, lay-up 21, comprising a plurality of fiber-reinforced layers 23, is disposed on top of a release sheet 25, which is in turn arranged on a mold plate 27. Optional release sheet 11 is disposed on top of the lay-up, and vacuum bag 1 is placed over all. As shown in FIG. 4, a plurality of interconnected channels 7 are defined between the vacuum bag 1 and the release sheet 11 (or the upper surface of lay-up 21, if release sheet 11 is not used). High temperature sealing tape 29 around the perimeter of the lay-up assures an air-tight seal.

Air within the vacuum bag is evacuated through vacuum application port 31. Channels 7 facilitate removal of the air by providing pathways to the vacuum application port. As air is removed, the channels 7 gradually and uniformly collapse. Upon completion of evacuation, the pattern in vacuum bag 1 is completely relaxed under atmospheric pressure and assumes a locally flat form, such that the bag is in intimate contact with the surfaces of optional release sheet 11 (or lay-up 21) without the formation of air pockets or wrinkles, as shown in FIGS. 5–6. The lay-up is now ready for curing in a known manner, e.g., by heating the lay-up to a resin curing temperature while maintaining a uniformly distributed pressure on the outer surface of the vacuum bag.

Figure 7:
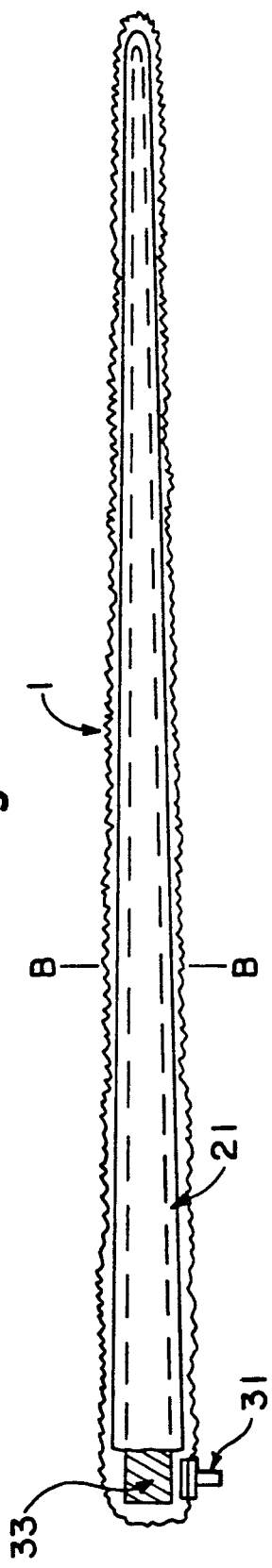
FIG. 7 is a partial cross-sectional view of an inventive vacuum bag completely enclosing a lay-up, which is disposed around a tool.
Figure 8:
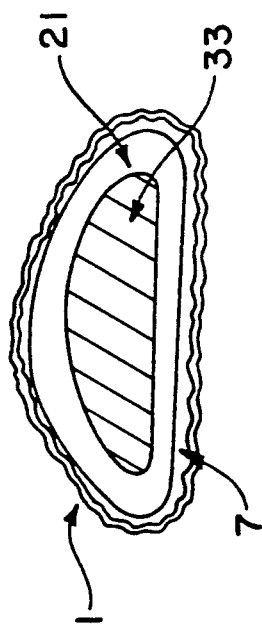
FIG. 8 is an enlarged cross-sectional view along line B—B of FIG. 7.

FIGS. 7 and 8 show a "free-bag" embodiment of the invention in which an elongated composite article, such as a helicopter blade, is produced. Vacuum bag 1 here completely encloses the lay-up 21. Lay-up 21 is in turn disposed about, and supported by, tool 33. Release materials can also be employed between tool 33 and lay-up 21, and/or between the lay-up and the vacuum bag, if desired.

TABLE 1

| Property | Method | A | B | C |
|---|---|---|---|---|
| Specific Gravity @ 23° C. | D792 | 1.14 | 1.14 | 1.13 |
| Melting Point, °F. | D789 | 420 | 420 | 451 |
| Tensile Strength of Yield, psi | D638 | 7,500 | 10,000 | 9,000 |
| Elongation at Fail, % | D638 | 300 | 300 | 325 |
| Izod Impact Strength, ft-lbs/in. notch | D256* | 1.4 | 1.2 | 1.2 |
| Flexural Strength at Yield, psi | D790 | 6,500 | 12,500 | 15,000 |
| Flexural Modulus, psi | D790 | 250,000 | 310,000 | 375,000 |
| Deflection Temperature @ 264 psi | D648 | 130 | 133 | 135 |

A) polyamide 6: flexible, heat stabilized nylon-6 for blown film
B) polyamide 6-66: flexible, heat stabilized copolymer for blown film
C) polyamide 66: heat stabilized extrusion grade nylon-66
All methods listed by ASTM number
All tensile properties measured at testing speed of 2 in./min
All test specimens in "dry" state, <0.3% moisture
*⅛" × ¼" bar

What is claimed is:

1. A vacuum bag comprising a non-porous material having impressed therein a three-dimensional pattern which defines a plurality of interconnected channels, said vacuum bag being capable of collapsing such that upon completion of evacuation of said vacuum bag said three-dimensional pattern relaxes into a locally flat two-dimensional configuration.

2. A vacuum bag as claimed in claim 1, wherein said non-porous material is a plastic material.

3. A vacuum bag as claimed in claim 2, wherein said material is a thermoplastic material.

4. A vacuum bag as claimed in claim 2, wherein said plastic material is in the form of a sheet or film.

5. A vacuum bag as claimed in claim 4, wherein said sheet or film is mono- or biaxially oriented.

6. A vacuum bag as claimed in claim 2, wherein said plastic material is selected from the group consisting of a polyamide, a polyester terephthalate, a polyether ether ketone, a polyetherimide, a polyether sulfone, a polytetrafluoroethylene, a polyimide and a halohydrocarbon resin.

7. A vacuum bag as claimed in claim 6, wherein said plastic material is a polyamide.

8. A vacuum bag as claimed in claim 7, wherein said polyamide is selected from the group consisting of nylon 6, nylon 66, a nylon-6/nylon-66 copolymer, and a mixture thereof.

9. A vacuum bag as claimed in claim 1, wherein said three-dimensional pattern is a repeating geometric pattern.

10. A vacuum bag as claimed in claim 9, wherein said geometric pattern is a pyramidal pattern or a rectangular pattern.

11. A vacuum bag as claimed in claim 1, wherein said three-dimensional pattern is a plurality of irregular geometric patterns.

12. A vacuum bag comprising a non-porous material having impressed therein a three-dimensional pattern which defines a plurality of interconnected channels, said vacuum bag being capable of collapsing such that upon completion of evacuation of said vacuum bag said three-dimensional pattern relaxes into a locally flat two-dimensional configuration, said bag being produced by a method comprising the steps:
of providing a non-porous material as a substrate;
impressing on said substrate a three-dimensional pattern which defines a plurality of interconnected channels; and subsequently
forming said substrate into a vacuum bag.

13. A vacuum bag as claimed in claim 12, wherein said impressing is effected with a pair of embossing rollers.

14. A vacuum bag as claimed in claim 12, wherein said substrate is a plastic material.

15. A vacuum bag as claimed in claim 14, wherein said material is a thermoplastic material.

16. A vacuum bag as claimed in claim 14, wherein said rollers are heated.

17. A method of making a composite structure comprising the steps of:
applying a release material to a mold;
placing on said release material a resin impregnated lay-up comprising reinforcing fiber and uncured or partially cured resin which is to be formed into said composite structure;
enclosing said release material and said lay-up within a vacuum bag sealed to said mold, said vacuum bag comprising a non-porous material having impressed therein a three-dimensional pattern which defines a plurality of interconnected channels, whereby a plurality of channels are defined between said vacuum bag and the surfaces of said lay-up covered by said vacuum bag;
evacuating said vacuum bag, whereby said vacuum bag collapses such that upon completion of said evacuation the three-dimensional pattern in said vacuum bag relaxes into a locally flat two-dimensional configuration and said vacuum bag lies flat against said surfaces of said lay-up in intimate contact therewith; and
curing said resin in said lay-up to form said composite structure.

18. A method of making a composite structure comprising the steps of:
applying a first release material to a mold;
placing on said first release material a resin impregnated lay-up comprising reinforcing fiber and uncured or partially cured resin which is to be formed into said composite structure;

applying a second release material to the upper surface of said lay-up;
enclosing said lay-up and said first and second release materials within a vacuum bag sealed to said mold, said vacuum bag comprising a non-porous material having impressed therein a three-dimensional pattern which defines a plurality of interconnected channels, whereby a plurality of channels are defined between said vacuum bag and the surfaces of said lay-up and said second release material covered by said vacuum bag;
evacuating said vacuum bag, whereby said vacuum bag collapses such that upon completion of said evacuation the three-dimensional pattern in said vacuum bag relaxes into a locally flat two-dimensional configuration and said vacuum bag lies flat against said surfaces of said lay-up and said second release material in intimate contact therewith; and
curing said resin in said lay-up to form said composite structure.

19. A method of making a composite structure comprising the steps of:
enclosing a resin impregnated lay-up comprising reinforcing fiber and uncured or partially cured resin which is to be formed into said composite structure within a vacuum bag comprising a non-porous material having impressed therein a three-dimensional pattern which defines a plurality of interconnected channels, whereby a plurality of channels are defined between said vacuum bag and the surfaces of said lay-up covered by said vacuum bag;
evacuating said vacuum bag, whereby said vacuum bag collapses such that upon completion of said evacuation of the three-dimensional pattern in said vacuum bag relaxes into a locally flat two-dimensional configuration and said vacuum bag lies flat against said surfaces of said lay-up in intimate contact therewith; and
curing said resin in said lay-up to form said composite structure.

20. A method as claimed in claim 19, wherein said lay-up is disposed on a tool and said lay-up and said tool are enclosed within said vacuum bag.

21. A method as claimed in claim 20, wherein a release material is disposed between said lay-up and said tool.

22. A method of making a composite structure comprising the steps of:
applying a release material to at least one surface of a resin impregnated lay-up comprising reinforcing fiber and uncured or partially cured resin which is to be formed into said composite structure;
enclosing said release material and said lay-up within a vacuum bag comprising a non-porous material having impressed therein a three-dimensional pattern which defines a plurality of interconnected channels, whereby a plurality of channels are defined between said vacuum bag and the surfaces of said lay-up and said release material covered by said vacuum bag;
evacuating said vacuum bag, whereby said vacuum bag collapses such that upon completion of said evacuation the three-dimensional pattern in said vacuum bag relaxes into a locally flat two-dimensional configuration and said vacuum bag lies flat against said surfaces of said lay-up and said release material in intimate contact therewith; and
curing said resin in said lay-up to form said composite structure.

23. A method as claimed in claim 22, wherein said lay-up is disposed on a tool and said lay-up and said tool are enclosed within said vacuum bag.

24. A method as claimed in claim 23, wherein a release material is disposed between said lay-up and said tool.

* * * * *